United States Patent [19]

Schenk et al.

[11] Patent Number: 4,932,728
[45] Date of Patent: Jun. 12, 1990

[54] VEHICLE BRAKE CONTROL SYSTEM

[75] Inventors: Donald E. Schenk, Vandalia; Schuyler S. Shaw, Dayton; Edward J. DeHoff, Huber Heights; Scott A. Baughman, Springboro; Donald M. Flory, Arcanum; Timothy A. Haerr, Enon; Donald L. Parker, Middletown, all of Ohio; Thomas B. Taylor, Clarkston; George N. Villec, Ann Arbor, both of Mich.

[73] Assignee: General Motors Corporation, Detroit, Mich.

[21] Appl. No.: 349,601

[22] Filed: May 10, 1989

[51] Int. Cl.⁵ .............................................. B60T 13/68
[52] U.S. Cl. .................................. 303/119; 303/113; 303/116
[58] Field of Search ................... 188/181 A; 303/110, 303/111, 113, 114, 115, 116, 119

[56] References Cited

U.S. PATENT DOCUMENTS 4,658,749  8/1987  Otuski et al. ..................... 303/116
4,768,843  9/1988  Baughman et al. ............... 303/119

Primary Examiner—Duane A. Reger
Attorney, Agent, or Firm—Ernest E. Helms

[57] ABSTRACT

A vehicle braking system having a wheel lock control arrangement with isolation valves, solenoid, and brake control valves for the system. In one arrangement, each wheel brake and isolation valve has its own solenoid and control valve. Additionally, the isolation valve is configured in a manner to prevent premature drop out from isolation and to prevent any flow from a master cylinder brake apply pressure circuit to a pump pressure circuit.

2 Claims, 6 Drawing Sheets

VEHICLE BRAKE CONTROL SYSTEM

The invention relates to a control system for vehicle brakes, and more particularly to one which controls wheel lock to prevent or minimize vehicle wheel skid under various circumstances. The present invention is a distinctive modification of the anti-lock braking system (ABS) described in commonly assigned U.S. Pat. No. 4,768,843 Baughman et al. and the disclosure thereof is incorporated herein.

A feature of the invention is the provision of a wheel lock control system which may be adapted to or readily added onto a standard production booster and master cylinder of the type in common use for some years. In a vehicle brake system having such a master cylinder, it is common to have a pair of brake pressurizing circuits, one of which is pressurized by each of two pressurizing pistons in the master cylinder. In some instances the circuits are split so that one circuit pressurizes the front brakes and the other circuit pressurizes the rear brakes. In other systems a diagonal split is used in which one circuit pressurizes the left front wheel and the right rear wheel, and the other circuit pressurizes the right front wheel and left rear wheel. The latter system is particularly common in front wheel drive vehicles The system embodying the invention has a pressure equalizer valve which equalizes pressure in the pump pressurizing circuit with the pressure, if any, in one of the service brake pressurizing circuits from the master cylinder. Isolation valves are provided and are controlled by a three-position solenoid valve operated by a wheel lock control system having appropriate algorithms for operation thereof as is generally known in the art and which have been more specifically developed for system of the type disclosed and claimed but form no part of the invention herein claimed. It is also a feature of one of the embodiments disclosed to utilize such solenoid operated valves at each wheel.

IN THE DRAWINGS

FIG. 2A is similar to FIG. 1A and schematically illustrates the sensor and computer arrangement and connections to and from the system of FIG. 2;

FIG. 3A is a similar to FIGS. 1A and 2A and shows the sensor and computer connections to and from the system of FIG. 3;

FIG. 4A is similar to FIG. 3A and illustrates the sensor and computer connections as they are connected to and from the system of FIG. 4;

Figures 1, 1A:
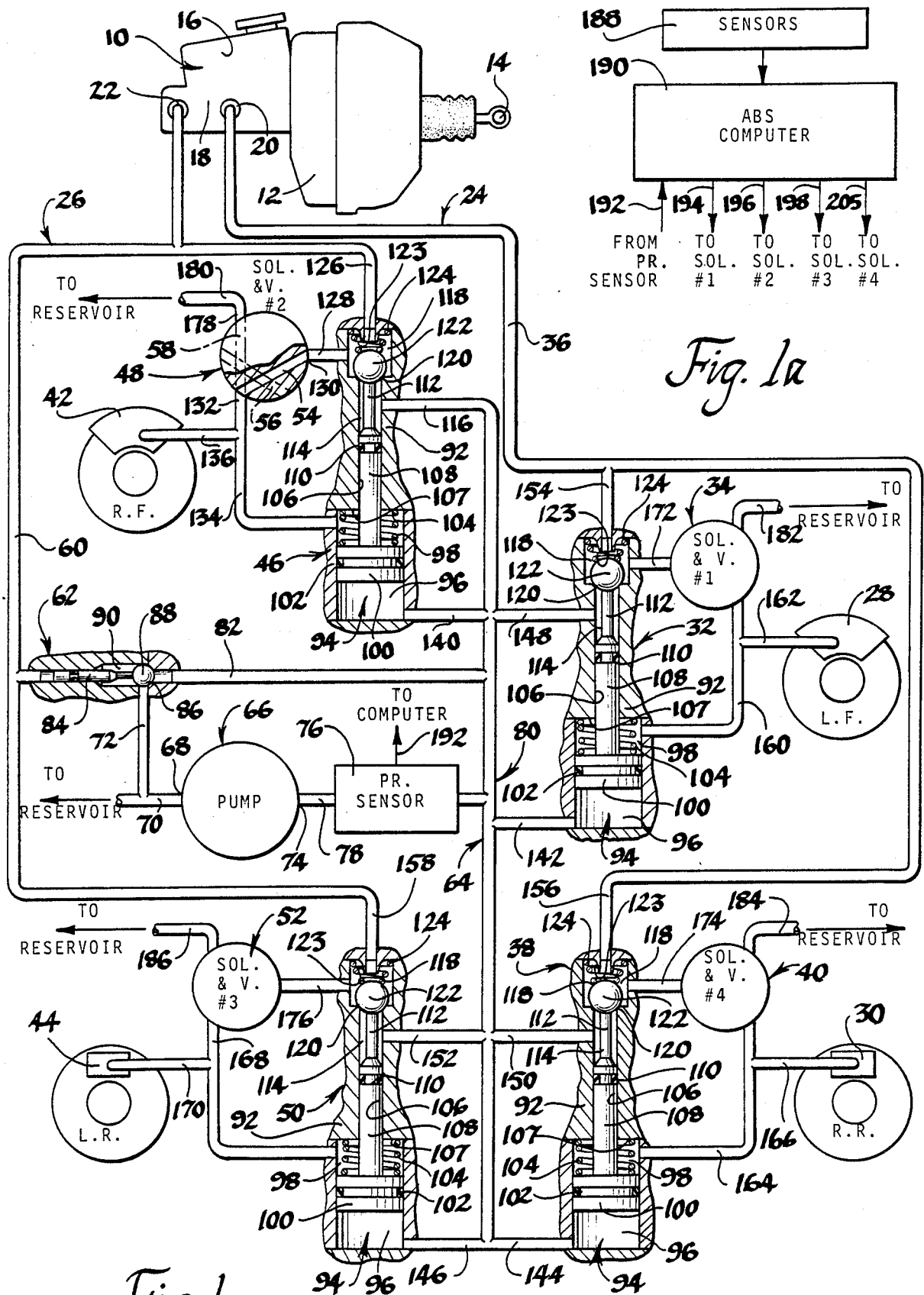
FIG. 1 is a schematic representation, with some components being broken away and in section, illustrating a first wheel lock control system embodying the invention.
FIG. 1A is a schematic representation showing the wheel lock control or Anti-Block System (ABS) computer and sensor arrangement and its connections to and from the system of the Baughman et al. ABS system.

All of the systems illustrated if FIGS. 1, 2, 3 and 4 are shown as being connected to a typical power brake system in common use including a master cylinder 10 actuated by a brake booster 12 through appropriate linkage such as a brake pedal, not shown, which actuates push rod 14. The master cylinder 10 is of the type having a reservoir 16 and a pressurizing section 18 which, as is well known in the art, may contain two pressurizing chambers, each chamber being connected to a separate wheel brake actuating circuit. In this particular instance, pressurizing chambers within the pressurizing section 18 have outlets 20 and 22 respectively connected to a first wheel brake pressurizing circuit 24 and a second wheel brake pressurizing circuit 26. Each circuit includes appropriate conduits and passages ultimately leading to the wheel brakes of that circuit. The first circuit 24 has included therein or connected thereto the left front wheel brake 28 and the right rear wheel brake 30. The left front wheel brake is provided with an isolation valve 32 and a solenoid operated valve 34, also identified on the drawing as solenoid and valve No. 1. The main brake line 36 of the first circuit 24 is connected to isolation valve 32 and is also connected to isolation valve 38 associated with the rear right wheel brake 30. Another solenoid and valve assembly 40 is also associated with the rear right wheel brake 30. The fluid connection arrangements with regard to the isolation valves and the solenoid valves in circuit 24 are substantially identical. They will be further described below in greater detail in relation to a typical isolation valve and solenoid valve.

The second circuit 26 includes the right front wheel brake 42 and the left rear wheel brake 44. Wheel brake 42 has associated therewith an isolation valve 46 and a solenoid and valve assembly 48, also identified on the drawings as solenoid and valve No. 2. The left rear wheel brake 44 has a similar isolation valve 50 and solenoid and valve assembly 52, also identified on the drawing as solenoid and valve No. 3, associated therewith. Solenoid and valve assembly 48 is schematically illustrated with parts broken away and in section and the valve passage 54 therethrough is illustrated in the normal service brake operating position in full section. Passage 54 is illustrated by dashed lines in the closed position 56, which is the position of the valve with the solenoid connected therewith operated to move the valve to that first energized position, and another position 58 in which passage 54 connects different portions of the fluid circuitry from the normal service brake position. It is to be understood that solenoid and valve assemblies Nos. 1, 2, 3 and 4 are similarly constructed and operable so that the valve portions thereof may assume any of the three positions illustrated with regard to solenoid and valve assembly No. 2.

The second vehicle brake circuit 26 has its main brake pressure line 60 connected to isolation valve 46 and also to isolation valve 50 in a manner like that of the first brake circuit main line 36. Main brake pressure line 60 is also connected, in parallel with the two isolation valves, to a pressure equalizing valve assembly 62 to be further described.

A pump brake fluid pressurizing circuit identified generally as pump circuit 64, includes a pump and motor assembly 66 which has a pump inlet 68 connected by a suitable passage 70 to a reservoir, which may be the reservoir 16 of the master cylinder assembly or may be a separate reservoir. It is here noted that another passage 72 connects the pressure equalizing valve assembly 62 with passage 70 and therefore to the reservoir. The pump outlet 74 is connected through a pressure sensor 76, which may either sense pump output pressure or may be a flow sensor sensing the flow of fluid therethrough from the pump, but is hereinafter referred to as a pressure sensor. It is to be understood that in the further description, as well as in the claims where this pressure sensor is referred to, it may instead be a fluid flow switch sensing the output flow of brake fluid from pump 66. The pump output fluid from output passage 78, after passing through or being exposed to the pressure sensor 76, is then connect d to the pump circuit main line 80. This circuit has branches connected to each of the isolation valves and to the pressure equalizing valve. More specifically, branch 82 is connected to the pressure equalizing valve assembly 62, which includes a valve piston 84 exposed on one end thereof to any pressure in brake circuit line 60, and a valve seat 86 through which pump circuit branch 82 is connected. A check valve 88 is positioned in a valve chamber 90 and is normally engaged with valve seat 86. So long as service brake pressure is generated in the main brake pressure line 60 of brake circuit 26, piston 84 continually urges valve 88 into engagement with valve seat 86, and normally holds the valve against that seat so long as the pressure in the pump circuit branch 82 does not exceed the pressure in the brake line 60. The passage 72 is connected with the valve chamber 90 adjacent the valve seat 86 so that when the pump pressure in branch 82 acting on the check valve 88 exceeds the pressure in brake line 60, the valve 88 is moved leftwardly as seen in the drawing, moving piston 84 with it, and opening pump circuit branch 82 to the passage 72 leading back to the reservoir. This therefore acts a pressure equalizing valve in which the pressure in the pump circuit 64 is not permitted to be greater than the pressure in the brake line 60. In order to provide such equalization, the effective area of the valve seat 86 exposed to branch 82 and the effective area of piston 84 exposed to brake line 60, are equal. It is clear that under some circumstances, should the pressures be preferred to be unequal, unequal surface areas so exposed may be provided to provide the appropriate pressure ratio.

Isolation valve 46 will now be further described and it is the same type of construction as isolation valves 32, 38 and 50. The isolation valve housing 92 is provided with a piston chamber 94 divided into a first portion 96 and a second portion 98 by a piston head 100 reciprocably received therein. A piston seal 102 on piston 100 effectively seals chamber portions 96 and 98 from each other. The piston 100 is reciprocably movable in the chamber 94 and is continually urged by a piston spring 104 to tend to increase the volume of chamber portion 98 and decrease the volume of chamber portion 96. Chamber 94 opens into a valve bore 106 in housing 92. A piston plunger 108, which may be integral with or firmly attached to piston head 100, is reciprocably and sealingly received in the valve bore 106. Seal 110 provides this the appropriate sealing action. The end of plunger 108 opposite piston 100 is provided with a reduced diameter section 112 which cooperates with a portion of valve bore 106 to provide an annular chamber 114. This chamber is continually connected to the pump circuit main line 80 by branch 116. The end of the valve bore 106 opposite the piston chamber 94 is formed to provide a valve chamber 118 having a lower valve seat 120 opening into the valve chamber through which the portion of piston bore containing the piston plunger 108 opens. A check valve 122 is continually urged into seating engagement with valve seat 120 by a valve spring 124, also contained in chamber 118. The second vehicle brake circuit main line 60 has a branch 126 opening into valve chamber 118 at the end thereof opposite lower valve seat 120 through an upper valve seat 123. A passage 128 connects valve chamber 118 with the solenoid operated valve inlet 130. One solenoid valve outlet 132 is connected to a passage 134, one branch 136 thereof being a brake line segment connected to the right front wheel brake 42. Passage 134 is also connected to the chamber portion 98 on the opposite side of piston 100 from chamber portion 96. Piston chamber portion 96 is connected by a branch 140 to the pump circuit main line 80. Similar branches 142, 144 and 146, are similarly connected to the isolation valves 32, 38 and 50. Likewise, pump main line branches 148, 150 and 152, corresponding to branch 116, are connected in a manner similar to branch 116 to isolation valves 32, 38 and 50. It is also here noted that branches 154 and 156 of the first circuit main line 36 are connected to isolation valves 32 and 38 in a manner similar to branch 126 of the second circuit main line 60, and branch 158 of the second circuit main line 60 is similarly connected to isolation valve 50. Likewise, passages 160 and 162 connect isolation valve 32, the valve of solenoid valve assembly 34, and the left front wheel brake 28 in a similar manner to that of passages 134 and 136 above described. Also likewise, passages 164 and 166 interconnect isolation valves 38, the valve of solenoid and valve assembly 40, and the rear right brake 30 in a manner similar to passages 134 and 136. Passages 168 and 170 similarly connect isolation valve 50, the valve of solenoid and valve assembly 52 and the left rear brake 44. Passages 172, 174, and 176 similarly connect isolation valves 32, 38 and 50 with the respectively associated valve portions of the solenoid and valve assemblies 34, 40 and 52, all in a manner similar to the connection of passage 128 between isolation valve 46 and the solenoid and valve assembly 48. Solenoid and valve assembly 48 has another valve outlet 178 connected to a passage 180 leading to a reservoir which may be the reservoir 16 of the master cylinder 10 or may be a separate reservoir. Similar passages 182, 184 and 186 respectively connect solenoid and valve assemblies 34, 40 and 52 to reservoir.

Figure 2:
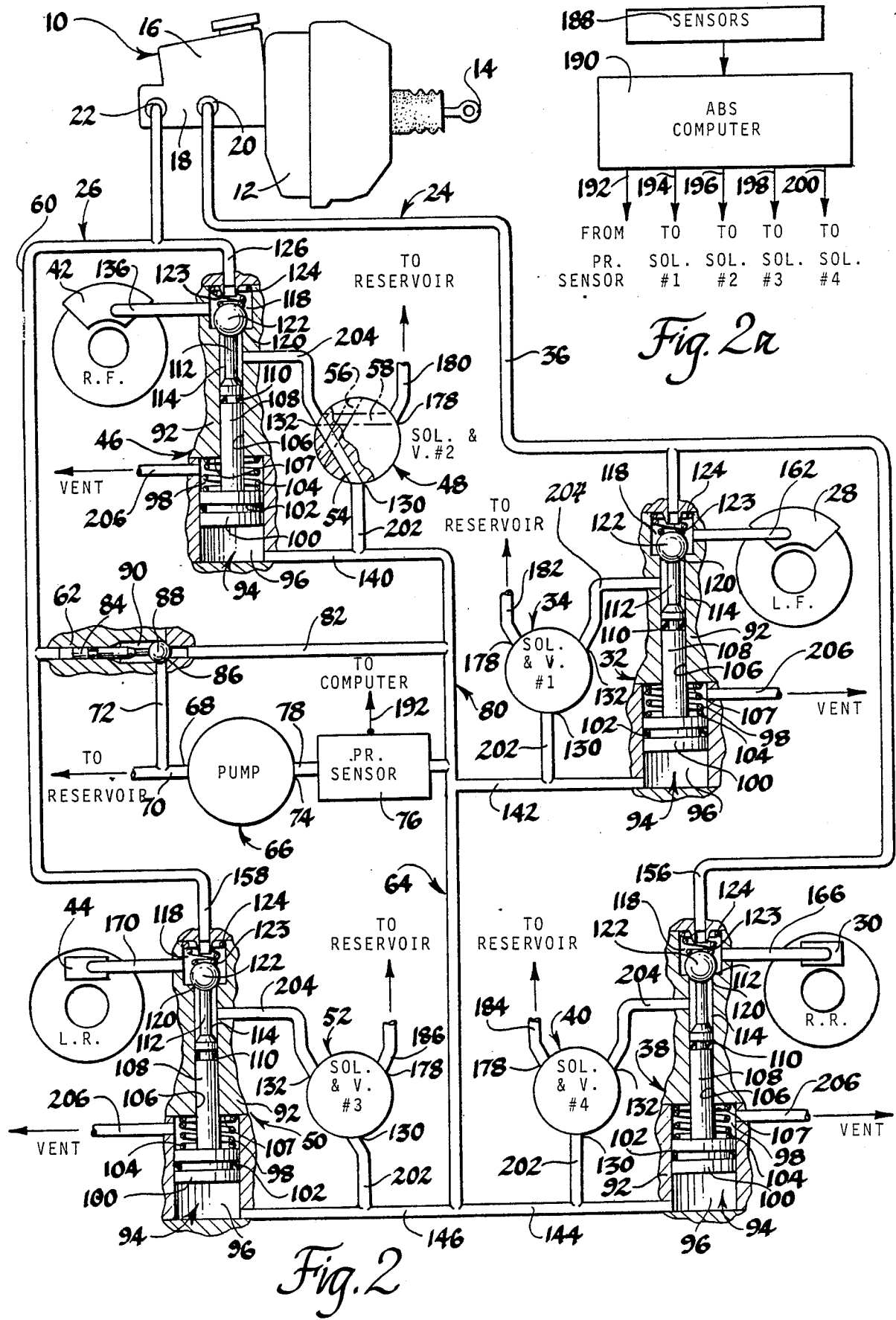
FIG. 2 is a schematic representation of another arrangement embodying Baughman et al. in a vehicle wheel lock control system as part of a vehicle brake system, with parts broken away and in section.
Figure 3:
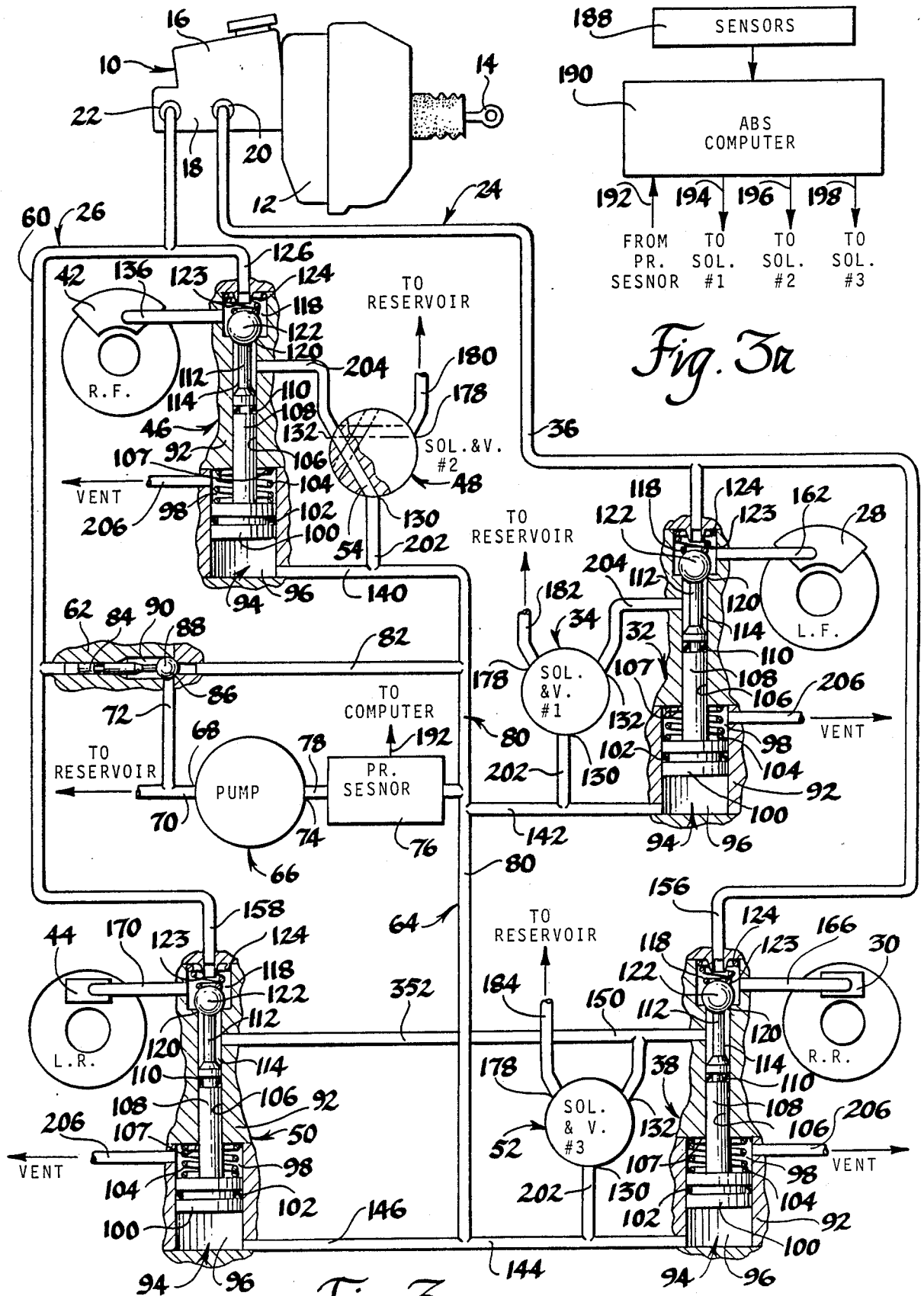
FIG. 3 is another embodiment of the invention schematically illustrating the vehicle brake system and the wheel lock control system portion thereof, with parts broken away and in section.
Figure 4:
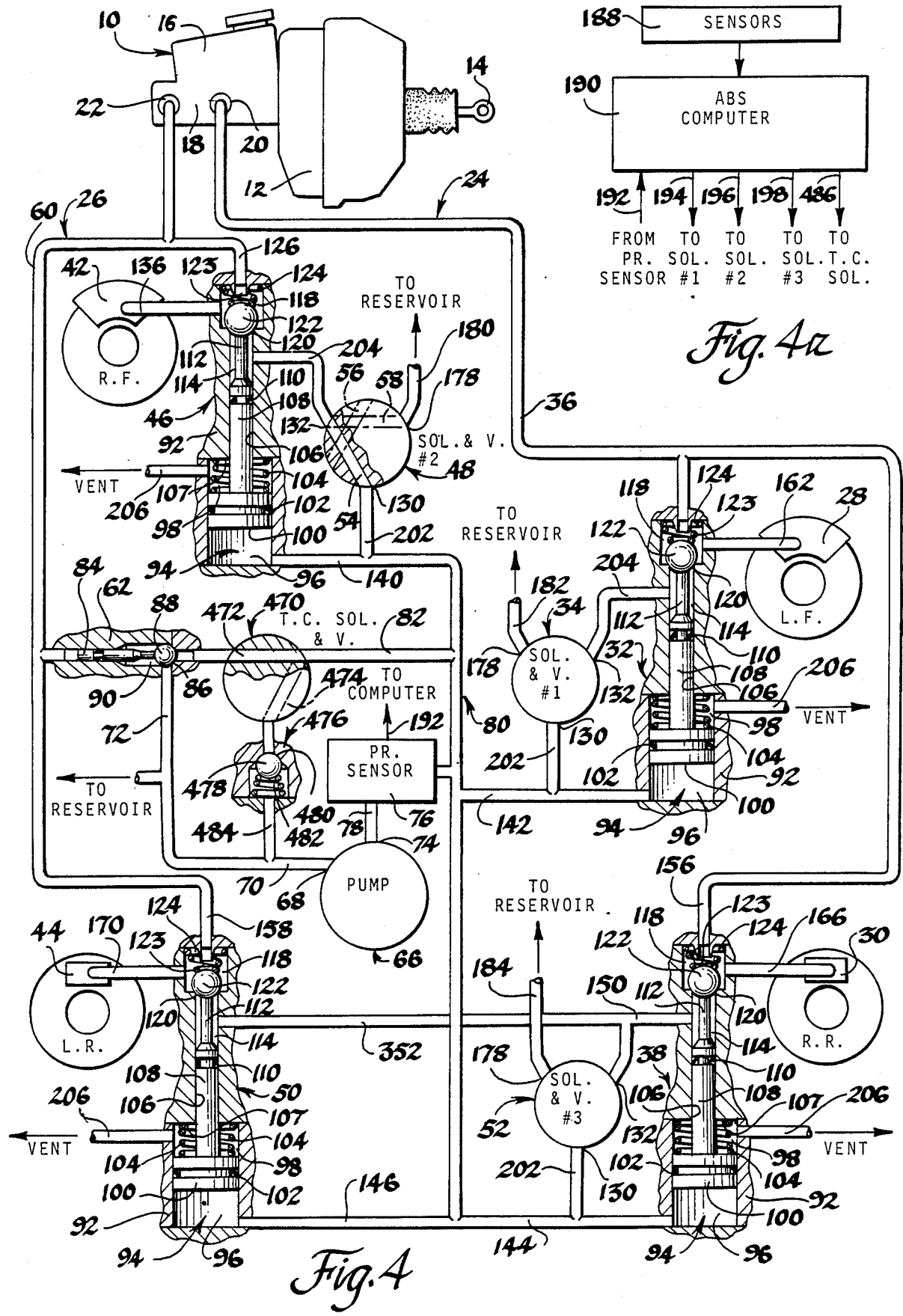
FIG. 4 is a system similar to that of FIG. 3 but also incorporating a traction control arrangement of the type that may be incorporated in the systems of FIGS. 1 and 2 as well. Parts are illustrated as being broken away and in section.

FIG. 1A is a schematic illustration of the electrical and electronic control system for operating the wheel lock control system of FIG. 1, and is similar to the control arrangements shown in FIGS. 2A, 3A and 4A. In each instance, appropriate sensors 188 sense various wheel conditions and brake conditions which may include by way of example, wheel speed, wheel acceleration, wheel deceleration, vehicle lateral acceleration and deceleration, road grade, pressures in various parts of the entire vehicle braking system, or any of these or other similar conditions considered appropriate to provide signals to the ABS compute 190 for wheel lock control purposes or in the instance of FIG. 4A, also to include traction control arrangements and signals. The computer 190 is schematically illustrated as receiving a signal 192 from the pressure sensor 76, and sending signals 194, 196, 198 and 200 to the solenoid portions of the solenoid and valve assemblies Nos. 1, 2, 3 and 4, further identified respectively in the drawings as assemblies 34, 48, 52 and 40. It also sends start and stop signals to pump and motor assembly 66. The computer 190 contains appropriate algorithms and other controls to operate the wheel lock control system of FIGS. 1, 2, and 3, as well as the traction control system in FIG. 4, as appropriate. The details of the electronics contained in sensors 188 and computer 190 are not a part of this invention in any detail, being otherwise provided and the subject of separate inventions. Insofar as the invention herein disclosed and claimed is concerned, it is sufficient to be aware, as those skilled in the art are, that the computer will receive appropriate signals and will generate appropriate signals to operate the systems connected thereto as described.

Since the solenoid and valve assemblies, the isolation valve assemblies, the pressure equalizing valve assembly, the pump and motor assembly and the pressure sensor are substantially identical in each of FIGS. 2, 3 and 4, only with certain connections being differently provided in some instances, and with the solenoid and valve assembly 52 being omitted in FIGS. 3 and 4 with appropriate different fluid passage arrangements, the same reference numerals are provided on these assemblies where ever possible as well as the same reference numerals for the various fluid pressure lines, passages and branches so long as they are connected in the same manner that they are connected in FIG. 1.

In the system of FIG. 1, normal vehicle service braking is obtained by actuation of the booster and master cylinder pressurizing circuits 24 and 26. More specifically, the brake actuating pressure in circuit 24 passes through main brake line 36 to the left front wheel brake 28 and the right rear wheel brake 30 by going through the check valve chamber 118 at the top of each associated isolation valve and then passing through the associated solenoid and valve assembly to the wheel brake. The service braking pressure is also provided in the chamber portion 98 on the upper side of the piston 100 of each isolation valve and cooperates with the force of spring 104 to prevent the piston 100 and its plunger 108 from moving upwardly to unseat the ball check valve 122 from its lower seat 120 and seat it on its upper seat 123. The pump 66 may be operated when the service brakes are applied so as to pressurize the pump circuit 64. However, the pressure in this circuit is limited by the equalizing valve assembly 62 so that it is no greater than the fluid actuating pressure in the second service braking circuit 26. It is preferred, however, that the pump be operated only when the computer sends a signal to energize one or more solenoids of the various solenoid and valve assemblies. The second service braking circuit 26 is connected in the same manner to to right front brake 42 and the left rear brake 44 through the associated isolation valves 46 and 50 and solenoid and valve assemblies 48 and 52. Since, if the pump is energized each time the brakes are applied, the pump pressure exerted under piston 100 is the same as the service brake pressure on the other side of the piston, and the force of spring 98 is sufficient, piston 100 is not moved upwardly during normal service braking operation. Thus the wheel brakes are applied and released in the usual manner. Upon release of the service brakes, the equalizer valve 62 will dump the pump pressure system to reservoir through branch 82, passage 72 and passage 70.

When the vehicle service brakes are applied and it is necessary to actuate the wheel lock control system to prevent one or more wheel brakes from locking the wheel, the following actions take place. Assuming that the right front wheel is incipiently approaching wheel lock and such condition is sensed by sensors 188, the computer control arrangement 190 sends an appropriate signal to solenoid and valve assembly No. 2. The solenoid is actuated to move the valve to a hold position which is the position illustrated by reference numeral 56 in which the valve passage 54 is disconnected from all of its inlets and outlets. It is also preferable that the pump is energized at the same time. The valve movement prevents any further increase in wheel brake pressure at wheel brake 42 even though the vehicle operator may increase the pressure in the service brake circuit main line 60. If this holding action is insufficient to prevent wheel lock, the wheel brake 42 may be released to a lower operating pressure by a further signal from the computer 190 transmitted to solenoid and valve assembly No. 2 to move the valve passage 54 to position 58, thereby connecting the passages 134 and 136 with the reservoir passage 180. This will release the pressure in the wheel brake 42, and will also release the pressure in the piston chamber portion 98. Meanwhile, pump 66 is generating and maintaining a pressure in its circuit 64 which is equal to the pressure in the secondary circuit main line 60 and that pressure is applied to the piston chamber portion 96 of isolation valve 46 as well as chamber 130 of that isolation valve. Since the pressure has been reduced or completely released in chamber portion 98, piston 100 and its plunger 108 are moved upwardly as seen in the drawing, forcing valve 122 away from its valve seat 120 and into engagement with its upper valve seat 123, thereby closing off the service brake line 60 from the isolation valve. Therefore the master cylinder brake actuating pressure in circuit 26 is isolated from wheel brake 42. Under these conditions, wheel brake actuating pressure to brake 42 is released as above described by moving the solenoid valve to the position 58 of its passage 54. As needed and determined by the computer 190 and its algorithm, pressure can be reapplied to the wheel brake 42 from the pump pressure circuit by sending a signal to the solenoid and valve assembly No. 2 to move the valve passage 54 back to the position shown in FIG. 1. The pump pressure will then pass through the pump circuit main line 80 and branch 116, then through chamber 130 and valve seat 120 into chamber 118, then through passage 128, valve passage 54, and passages 134 and 136 to reapply the wheel brake 42. The energization and deenergization of the solenoid portion of assembly 48 is accomplished in reapply increments under control of the computer 190. Thus, for example, the brake actuating pressure actually delivered to wheel brake 42 may be increased approximately 100 p.s.i., at which time the solenoid is reenergized to move passage 54 to the hold position 56. This does not permit sufficient pump pressure to be transmitted to chamber portion 98 to recycle the isolation valve. If further brake reapply pressure is required, the computer will again cycle the solenoid and increase the brake pressure an additional amount, assuming that the vehicle operator still has the booster and master cylinder actuated, usually to about the maximum at what is commonly referred to as panic braking. Thus the increase in brake actuating pressure at brake 42 may be held at any intermediate position or may be reduced or may be applied to a still higher pressure, eventually reaching the point where no wheel lock control operation is needed and the pump pressure, which is equal to the pressure in service brake line 60, is permitted to enter chamber 98 at a sufficiently high pressure value to cycle the isolation valve by moving piston 100 and plunger 108 downwardly so that check valve 122 is moved away from its upper seat 123 and reengages its lower seat 120. This restores service braking operation to the wheel brake 42.

The same type of operation can occur at any of the other wheel brakes 28, 30 and 44. This may occur at more than one wheel brake as needed. One particular advantage of the system of FIG. 1 is that the wheel brake pressure for each wheel brake is monitored by the associated isolation valve so that only the wheel brake actually needing to be controlled for wheel lock control purposes is cycled, thereby minimizing the load on pump 66 when the pump does not have to also act on the other wheel brakes. Of course, the pump is capable of actuating all combinations of wheel brakes in the wheel lock control mode as needed. Since the pump is preferably turned on when the first signal is sent to solenoid and valve assembly No. 2 to initially establish the wheel lock control mode, and is turned off when no signal is provided thereto for a predetermined period of time, the pump upon brake release will have its output pressure decreased by the equalizing valve 62 to the pressure residing in the brake circuit main line 60 and the pump will not again be energized until wheel lock control is needed.

The system of FIG. 2 is somewhat modified in relation to that of FIG. 1 in that the solenoid and valve assemblies are located in a different connecting arrangement with the pump circuit and the isolation valves. They are primarily in a branch of the pump circuit instead of a branch of the service brake circuit. More particularly, the inlet 130 of each solenoid and valve assembly is connected by a passage 202 with the pump circuit main line 80 and the outlet 132 is connected by a passage 204 with the annular chamber 130 of each isolation valve 32, 38, 46 and 50. Therefore the passage 136 connecting isolation valve chamber 118 with wheel brake 42, and similar passages 162, 166 and 170 for the other wheel brakes, is directly connected to the isolation valve chamber 118. Piston chamber portion 98 is vented to atmosphere through vent passage 206 instead of being connected to the brake pressure circuit through the solenoid operated valve.

In normal service brake operation, as before, service brake pressure is delivered through the two brake circuit main lines 36 and 60 to the valve chamber 118 of each isolation valve and then directly to each wheel brake through the connecting passage 136 to brake 42, 162 to brake 28, 166 to brake 30, and 170 to brake 44. The check valve 122 of each isolation valve remains seated against its lower valve seat 120. When any sensor 188 signals to the computer that there is a need to operate the wheel lock control system, the computer will operate the appropriate solenoid and valve assembly and at the same time energize pump 66 to generate pump pressure in the pump circuit 64. The pump circuit will immediately be pressurized, to the same level as that of the service brake line 60, as will be each of the isolation valve chambers 96, immediately moving the isolation valve piston 100 and plunger 108 upwardly to move check valve 118 and into engagement with its upper seat 123. This immediately cuts off all service brake line pressure to the brakes. If only one wheel, such as the right front wheel, requires wheel lock control action, only the solenoid and valve assembly 48 will be energized to the first level to move the valve passage 54 to the hold position 56. The other solenoid and valve assembles will remain in the same position as for service brake operation and the brakes connected therewith will be operated by pump pressure which is at the same pressure as that in the service brake main line 60 because the equalizing valve 62 keeps the pump pressure at that equal pressure. However, pump pressure is disconnected from the wheel brake 42 by the valve portion of assembly 48 so that the pressure cannot continue to increase in that brake if the vehicle operator is continuing to generate greater brake pressure by the master cylinder. If the pressure needs to be released in wheel brake 42, the solenoid portion of solenoid and valve assembly 48 is further actuated from computer 190, moving passage 54 to position 58, which releases wheel brake actuating pressure from wheel brake 42 to reservoir through passage 180. The solenoid and valve are then cycled between the release, hold and apply positions as needed in accordance with signals from computer 190 to continue wheel lock control operation as long as it is necessary. When the wheel brake pressure is permitted by the signals from the computer 190 to again reach the service brake line pressure, the solenoid operated valve of assembly 48 will return to the position shown in solid lines in the drawing so that passage 54 again connects inlet 130 and outlet 132. The brake apply pressure for wheel brake 42 will then be supplied by the pump pressure circuit, which continues to b equal to the service brake pressure in main line 60. When the operator releases the master cylinder and no service brake pressure is then in existence in circuits 24 and 26, the pump pressure also drops to that same level, releasing the pressure in chamber portion 96 and permitting the isolation valve to cycle back downwardly to the position where check valve 118 again is seated on its lower seat 120 and the isolation valve is repositioned for normal service brake operation as earlier described.

The system illustrated in FIG. 3 is similar to that of FIG. 2. However, the solenoid and valve assembly No. 3, also identified as assembly 52, is eliminated. Instead, a passage 352 connects to passage 150 of the solenoid and valve assembly No. 4, also identified as assembly 40, so that the solenoid and valve assembly 40 controls both isolation valves 46 and 50. This arrangement, instead of giving individual wheel lock control to each of the rear wheel brakes, controls both rear wheel brakes in a wheel lock control mode on a select-low basis. Therefore the sensors 188 either include a sensor acting on a drive portion relating to both rear wheels if they are drive wheels, or sense both wheels and send signals to the computer 190 which are combined to provide a select-low operation. Thus if either rear wheel requires the wheel lock control mode of operation, the solenoid and valve assembly 40 is operated and both rear wheels operate in the wheel lock control mode even though only one of them may be incipiently locking. The two front wheels are still independently controlled as in FIG. 2.

FIG. 4 is similar to FIG. 3 with added control for traction control of an appropriate wheel. The hydraulic arrangement is the same as that of FIG. 3 with a solenoid and valve assembly 470 positioned in the passage 82 between the pump main line 80 and the equalizing valve 62. The normal deenergized position of the assembly 470 has the valve passage 472 connected to provide a continuation of passage 82 to the equalizing valve 62 as before. Passage 472 is moved upon energization of the solenoid portion of the assembly to the position shown at 474. In this position the pump pressure from pump main line 80 passing into passage 82 is disconnected from the equalizing valve 62 and is directed through a pressure relief valve assembly 476, which is schematically illustrated as being a ball check valve 478 normally held against its seat 480 by a spring 482. The preload on spring 482 is preferably set at a value which will require the pump pressure to reach a predetermined operating pressure value for operation of the brake system before being relieved. For example, this may be about 700 p.s.i. When the pump pressure exceeds the predetermined set pressure limit, valve 478 is moved away from its valve seat and the excess pressure is dumped to reservoir through passage 484 to the passage 70 leading to the reservoir so as to maintain the predetermined pump pressure.

In this arrangement, the wheel lock control system operates in the same manner as that of FIG. 3. However, when traction control is required, the system operates to apply the wheel brake on the wheel which is spinning so as to transfer power to the non-spinning drive wheel through the vehicle differential. For this purpose the sensors 188 pick up the spinning of one wheel when there is no vehicle service brake pressure being applied and send appropriate signals to computer 190. The computer determines that traction control is needed and generates the traction control signal 486 which is delivered to the traction control solenoid and valve assembly 470. This signal causes the solenoid to be energized and the valve to be moved so that passage 472 is in the position 474 illustrated in dashed lines. It also energizes pump 66 and the pump immediately builds up pressure in the pump pressurizing system. At the same time signals are sent to all of the solenoids except for the wheel requiring traction control to move the valves controlled by those solenoids to the hold position illustrated as position 56 for each passage 54. This permits the brakes other than the traction control wheel brake to be operated by the service brake pressure but not in fact being operated at this time since no brake pressure is being generated by the master cylinder. It also actuates the isolation valve associated with the wheel requiring traction control to be cycled, moving the isolation valve piston and plunger upwardly to seat the isolation valve 118 on its upper seat 123 and therefore apply pump pressure to that wheel brake through the solenoid operated valve passage 54. The slipping wheel is therefore braked and power is able to be transferred through the drive differential to the other driving wheel to generate sufficient traction to move the vehicle without spinning the drive wheel When traction control is no longer needed, the computer sends appropriate signals to the solenoids to return them to the service brake position shown in the drawing.

Figure 5:
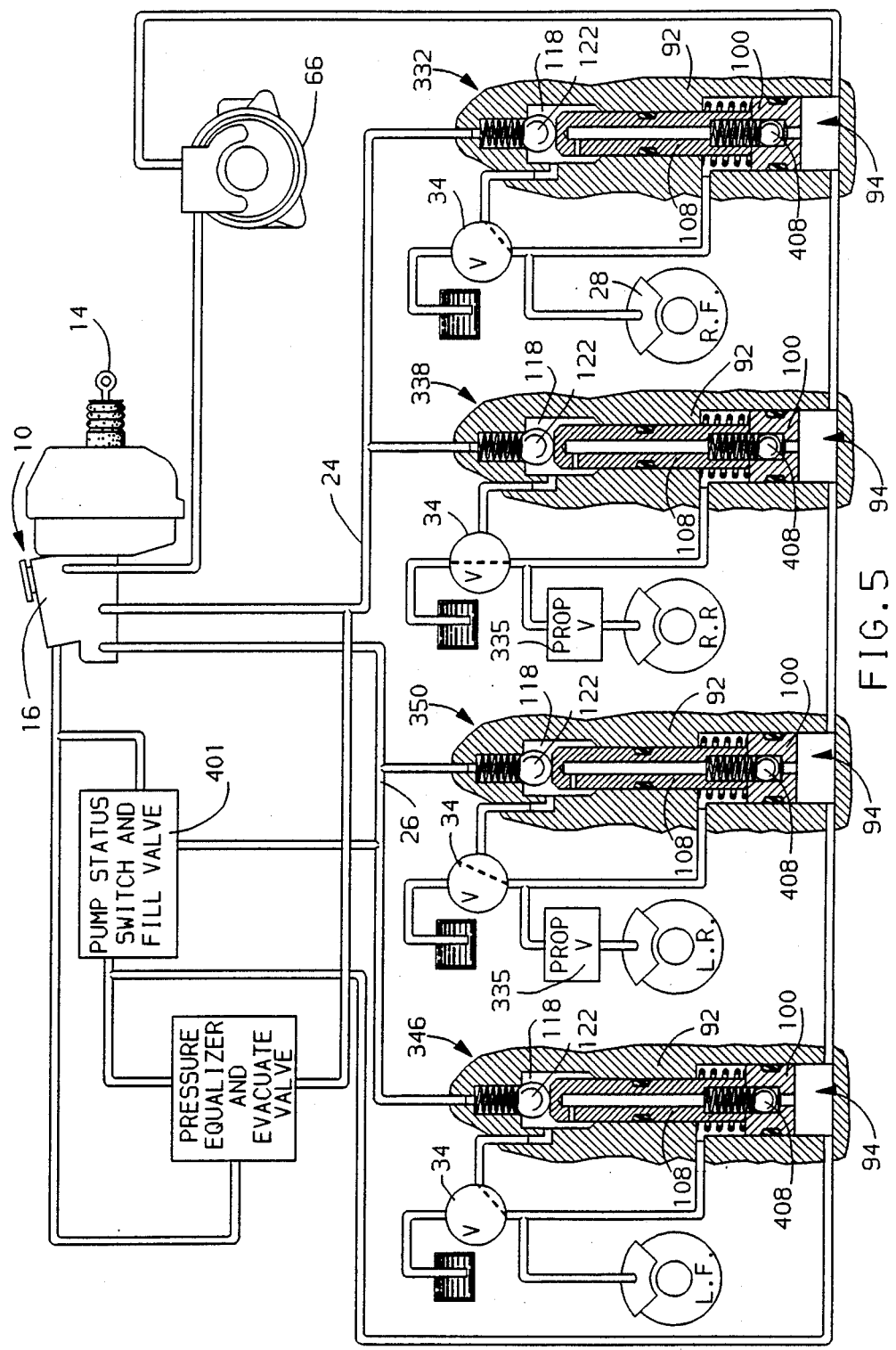
FIG. 5 is a preferred embodiment according to the present invention.
Figure 6:
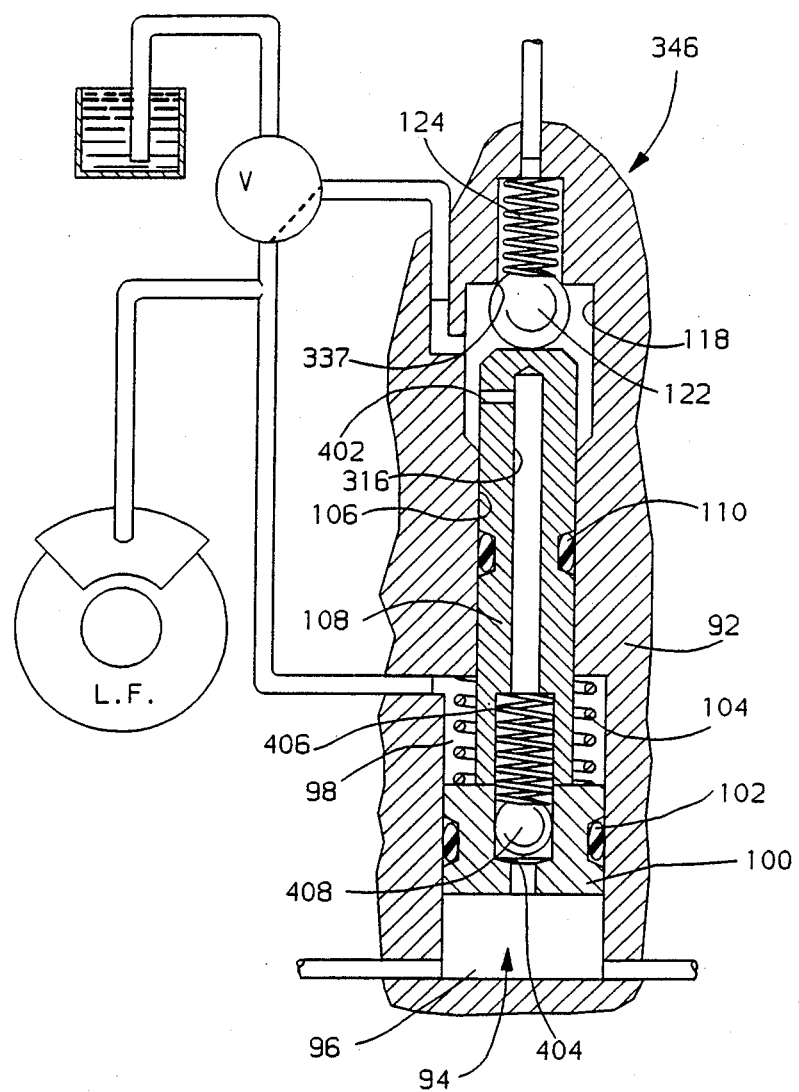
FIG. 6 is an enlarged view of a portion of FIG. 5.

Referring additionally to FIGS. 5 and 6, a preferred embodiment ABS according to the present invention is provided Like items performing the same functions are the same numbers as those previously given in FIG. 1.

Isolation valve 346 is associated with the left front wheel brake. Isolation valve 346 is essentially identical to the isolation valves 332, 350 and 338. The isolation valve housing 92 is provided with a piston chamber 94 divided into a first portion 96 and a second portion 98 by a piston head 100 reciprocally received therein. A piston seal 102 on piston head 100 effectively seals chamber portions 96 and 98 from each other. A piston 100 is reciprocally movable in chamber 94 and is continually urged by a piston spring 104 to tend to increase the volume of chamber portion 98 and decrease the volume of chamber portion 96. Chamber 94 opens into a valve bore 106 in housing 92 through a shoulder. A piston plunger 108 which may be integral with or firmly attached to piston head 100 is reciprocally and sealably received in the valve bore 106. Seal 110 provides the above-noted appropriate sealing action.

A ball 122 provides a first check valve means and is continually urged downward away from a valve seat 337 and towards the piston 100 by a valve spring 124 contained in multi-bore valve chamber 118. Valve spring 124 can also provide the biasing force on the piston 100.

The piston has an interior first passage 316. The interior passage 316 is also provided with a side bore 402 and a check valve seat 404. Typically the piston head 100 will be detachably connected to the plunger stem 108 to allow the insertion of a ball 408 (spring biased by a spring 406) which provides a second check valve means in contact with seat 404. The remainder of isolation valve 346 is connected to the remainder of the system in a manner similar to that illustrated for the connection of isolation valve 46 in FIG. 1. The sensors 188 (FIG. 1A) and computer 190 work in a similar fashion as illustrated in the embodiment of FIG. 1.

The connection of isolation valves 332, 338 and 350 to their respective wheel cylinders is in like manner to the connection of isolation valve 346.

Additionally, the rear wheels of the braking system have proportioning valves 335 to the modulate the pressure delivered to the rear wheels. A more detailed explanation of the function of proportioning valves can be found by review of copending patent application Ser. No. 277,804 filed Nov. 30, 1988.

Although the function of the ABS system in FIG. 5 is similar to that of the system illustrated in FIG. 1, there are some added features. Isolation valve 332 is shown in the normal apply position with the solenoid 34 connecting the front wheel with the chamber 118. Fluid from the master cylinder 10 is allowed to pass by the first check valve 122 and to be delivered to the wheel 28. In like manner the brake fluid can reverse its path back to the master cylinder 10 on brake release. The second check valve 408 will be in a closed position and the fluid forces above and below the piston head in combination with the pressure applied by the spring 124 against the ball 122 and stem 108 and spring 104 against the piston head cooperate to balance the head within the chamber 94.

Isolation valve 338 illustrates the operation of the ABS system when anti-lock braking condition has been sensed by the sensor 190 (FIG. 1A) in a manner previously described. When such an occurrence occurs the isolation valve will move upward within the bore causing the first check valve ball 122 to mate with valve seat 337 and isolate the master cylinder 10 from the wheel brake. The upward movement of the piston is provided by the solenoid valve which is now been switched to connect the wheel brake with the reservoir, and therefore dropping wheel brake pressure and causing the piston to shift upward to the isolation position.

In the hold position, provided by the isolation valve 350, the pump pressure will hold the isolation valve 350 in a position isolating the master cylinder 10 from the wheel brake. The solenoid has cut-off fluid connection of the wheel brake with either the master cylinder 10 or the reservoir.

On the apply cycle (isolation valve 346), the solenoid will again connect the wheel cylinder with the chamber 118 and the pump pressure will overcome the second check valve 408 and fluid from the pump 66 will flow to the wheel cylinder.

(Note: On the hold cycle, the second check valve 408 will be open; initially, however, it will again close when the pressure within the chamber 118 equals that of the pump 66 minus fixed differential.)

An advantage of the present invention is that in situations when master cylinder 10 pressure is very close to wheel brake pressure (slight lock-up conditions), the addition of the second check valve 408 prevents the isolation valve 346 from sliding down slightly, allowing the master cylinder 10 (for a short interim period) to be exposed to the pump 66 pressure, thereby lowering the pressure within the master cylinder 10 and then having a cyclic effect of the pump 66 pressure then again closing the isolation valve 346.

The second check valve 408 ensures that wheel brake pressure will always be lower than pump 66 pressure (typically 100 p.s.i.), therefore, providing a hysteresis in the system, thereby ensuring against any premature release from the isolation position of the isolation valve 346.

The second check valve 408 on the apply cycle also prevents the pump pressure dropping too far below the master cylinder 10 pressure, thereby allowing the isolation valve(s) to prematurely drop from the isolation position since the check valve 408 will close whenever wheel brake pressure is 100 p.s.i. less than pump pressure. Therefore on the ABS apply cycle, under no circumstances can the pump 66 pressure drop to the point where a low pump pressure will allow a master cylinder 10 pressure to force the isolation valve 346 (or valves) out of its isolated position.

Additionally the present circuit has a pump status switch and fill valve to signal an alarm when there is a system malfunction. This valve also allows vacuum filling of the system.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein two vehicle wheel brakes and said second brake fluid circuit having therein two vehicle wheel brakes, the improvement comprising:

a wheel lock control system having an isolation valve associated with at least one of said vehicle wheel brakes, a first solenoid operated valve respectively associated with said brake associated with said isolation valve, a brake fluid pump and motor assembly having a pump pressurized brake fluid circuit associated with said first and second brake fluid circuits, and a pressure equalizer valve fluidly between one of said circuits and said pump pressurized brake fluid circuit; said isolation valve having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having a check valve chamber containing a first check valve continuously urged toward said piston, said piston having an internal first passage connecting said piston chamber on a side of said piston head opposite said shoulder with said check valve chamber, a second check valve within said first passage allowing flow only toward said valve chamber, biasing means urging said headed piston away from said shoulder with consequent decrease in volume of said piston pressure chamber, said piston plunger extending through said stepped chamber from said headed piston and having a reduced diameter end portion, second passage means operatively fluid connecting said check valve chamber and said wheel brake said isolation valve is associated, and third passage means fluid connecting said piston chamber first section on the opposite side of said headed piston from said piston pressure chamber and said wheel brake associated with the isolation valve;

said pump pressurized brake fluid circuit being fluid connected to each of said first passage means of said isolation valve and to one side of said pressure equalizing valve, one of said first and second fluid braking circuits being connected to the other side of said pressure equalizing valve to that fluid pressure therein acts on said pressure equalizing valve in opposition to fluid pressure in said pump pressurized brake fluid circuit, said pressure equalizing valve having a normally closed port in fluid communication with the reservoir of said pump, said pressure equalizing valve acting when the fluid pressure in said pump pressurized brake fluid circuit exceeds the fluid pressure in said one fluid braking circuit to open said port into communication with said pump pressurized brake fluid circuit and relieve pressure therein until the fluid pressures acting on said pressure equalizing valve are substantially equal;

said first solenoid operated valve being connected in said second passage means of isolation valve for said associated wheel brake and said solenoid operated valve having a first position fluid connecting said second passage means, a second position closing said second passage means connection with said check valve chamber and a third position opening said wheel brake to a fluid reservoir associated therewith and decreasing the brake actuating pressure acting on said wheel brake;

and control means controlling said solenoid operated valve and said pump to limit braking action of said wheel brake and substantially prevent wheel lock during vehicle braking.

2. In a vehicle hydraulic brake system having a dual pressurizing chamber master cylinder, a split braking system having a first brake fluid circuit receiving pressurized brake fluid from a first master cylinder pressurizing chamber and a second brake fluid circuit receiving pressurized brake fluid from a second master cylinder pressurizing chamber, said first brake fluid circuit having therein two of said vehicle wheel brakes and said second brake fluid circuit having therein the other two said vehicle wheel brakes, the improvement comprising:

a wheel lock control system having an isolation valve associated with at least one of said vehicle wheel brakes, a first, second third and fourth solenoid operated valves respectively associated with on of said brakes, a brake fluid pump and motor assembly having a pump pressurized brake fluid circuit associated with said firs and second brake fluid circuits, and a pressure equalizer valve fluidly between one of said brake fluid circuits and said pump pressurized brake fluid circuit;

each of said isolation valve having a stepped bore defining a piston chamber first section and a smaller diameter plunger second section separated by a shoulder and respectively receiving a headed piston and piston plunger therein for limited reciprocating movement, said headed piston and a portion of said chamber first section opposite said shoulder defining a piston pressure chamber, the other end of said chamber second section from said shoulder having a check valve chamber containing a first check valve continuously urged away from a first check valve seat and toward said piston, said piston having an internal first passage connecting said piston chamber on a side of said piston head opposite said shoulder with said check valve chamber, a second check valve within said first passage allowing flow toward said check valve chamber, biasing means urging said headed piston away from said shoulder with consequent decrease in volume of said piston pressure chamber, said piston plunger extending through said stepped chamber from said headed piston and having a reduced diameter end portion, second passage means operatively fluid connecting said check valve chamber and said wheel brake said isolation valve is associated, and third passage means fluid connecting said piston chamber first section on the opposite side of said headed piston from said piston pressure chamber and said wheel brake associated with the isolation valve;

said pump pressurized brake fluid circuit being fluid connected to each of said first passage means of said isolation valves and to one side of said pressure equalizing valve, one of said first and second fluid braking circuits being connected to the other side of said pressure equalizing valve so that fluid pressure therein acts on said pressure equalizing valve in opposition to fluid pressure in said pump pressurized brake fluid circuit, said pressure equalizing valve having a normally closed port in fluid communication with the reservoir of said pump, said pressure equalizing valve acting when the fluid pressure in said pump pressurized brake fluid circuit exceeds the fluid pressure in said one fluid braking circuit to open said port into communication with said pump pressurized brake fluid circuit and relieve pressure therein until the fluid pressures acting on said pressure equalizing valve are substantially equal;

said first solenoid operated valve being connected in said second passage means of isolation valve for said associated wheel brake and said solenoid operated valve having a first position fluid connecting said second passage means, a second position closing said second passage means connection with said check valve chamber and a third position opening said wheel brake to a fluid reservoir associated therewith and decreasing the brake actuating pressure acting on said wheel brake;

and control means controlling said solenoid operated valve and said pump to limit braking action of said wheel brake and substantially prevent wheel lock during vehicle braking.

* * * * *